United States Patent [19]
Walker

[11] Patent Number: 5,903,758
[45] Date of Patent: May 11, 1999

[54] METHOD AND APPARATUS FOR AUDITING DYNAMICALLY LINKED PROCEDURE CALLS

[75] Inventor: Michael S. Walker, Mountain View, Calif.

[73] Assignee: Sun Microsystems, Inc., Palo Alto, Calif.

[21] Appl. No.: 08/807,045

[22] Filed: Feb. 24, 1997

[51] Int. Cl.⁶ ........................................ G06F 9/45
[52] U.S. Cl. ................... 395/704; 395/685; 395/183.11
[58] Field of Search .............. 395/185.01, 685, 395/704, 708, 183.11, 183.14

[56] References Cited

U.S. PATENT DOCUMENTS

| | | | |
|---|---|---|---|
| 5,175,828 | 12/1992 | Hall et al. | 395/375 |
| 5,528,753 | 6/1996 | Fortin | 395/183.11 |
| 5,561,800 | 10/1996 | Sabatella | 395/700 |
| 5,583,988 | 12/1996 | Crank et al. | 395/185.01 |
| 5,659,751 | 8/1997 | Heninger | 395/685 |
| 5,732,273 | 3/1998 | Srivastava et al. | 395/704 |
| 5,748,878 | 5/1998 | Rees et al. | 395/183.14 |
| 5,758,061 | 5/1998 | Plum | 395/183.11 |
| 5,790,858 | 8/1998 | Vogel | 395/704 |

OTHER PUBLICATIONS

Linker and Libraries Guide, Sun Microsystems, Inc., Mountain View, CA, 1995.

*Primary Examiner*—Tariq R. Hafiz
*Assistant Examiner*—Antony Nguyen-Ba
*Attorney, Agent, or Firm*—Graham & James LLP

[57] ABSTRACT

The present invention is a method and apparatus for providing instrumentation of procedure calls in dynamically linked environments. More specifically, an embodiment of the present invention includes an API that allows a user to define procedures that are called during specific times during the execution of a runtime linker. By defining procedures in accordance with this API, the user can select procedures within a user program for auditing. The API also allows the user to define an entry procedure that will be called immediately before each audited procedure and an exit procedure that will be called immediately after each audited procedure. The runtime linker uses the procedures defined by the user to select procedures within the program for auditing. The runtime linker then arranges for the entry procedure to be called before, and the exit procedure to be called after, each audited procedure.

21 Claims, 5 Drawing Sheets

Figure 4

```
400 ⟋ .PLT0:
           save    %sp,-64,%sp
           call    runtime-linker
           nop
       .PLT1:
           .word   identification
           unimp
           unimp
           ...
312a ⟋ .PLT101:
           sethi   (_.PLT0, %g1)
           ba,a    .PLT0
           nop
312b ⟋ .PLT102:
           sethi   (_.PLT0, %g1)
           ba,a    .PLT0
           nop
```

```
400 ⟋ .PLT0:
           save    %sp,-64,%sp
           call    runtime-linker
           nop
       .PLT1:
           .word   identification
           unimp
           unimp
           ...
312a ⟋ .PLT101:
           sethi   (_.PLT0, %g1)
           sethi   %hi(first), %g1
           jmp     %g1+%lo(first), %g0

312b ⟋ .PLT102:
           sethi   (_.PLT0, %g1)
           ba,a    .PLT0
           nop
```

310 ⚡

METHOD AND APPARATUS FOR AUDITING DYNAMICALLY LINKED PROCEDURE CALLS

FIELD OF THE INVENTION

The present invention relates generally to tools for software instrumentation. More specifically, the present invention is a method and apparatus for auditing procedure calls and references to data objects in dynamically linked environments.

BACKGROUND OF THE INVENTION

In the field of software engineering, "instrumentation" refers to a set of techniques used to characterize or verify the behavior of a program. For example, instrumentation may be used to measure the runtime of selected parts of a program. Instrumentation may also be used to determine if, or how often, a particular procedure is called within a program.

The simplest instrumentation technique involves changes that are made within the source code from which the program is compiled. For example, print statements may be added to indicate that a program has reached a particular location and to print out diagnostic or statistical information. Code may also be added to time the execution of a program or program segments. Generally, this type of instrumentation is both widely used and problematic. The ease with which source code may be added accounts for the widespread use of this technique. Unfortunately, the addition of source code changes the characteristics of the program itself. These changes may be subtle, such as changes in program runtime, or they may be profound, such as inadvertent program incorrectness. In either case, the effectiveness of instrumentation through addition of source code may be limited.

A second technique for instrumentation uses the system compilation tools (compiler, assembly, linker and system libraries) to produce specialized instrumented executables. These instrumented executables include machine code that gathers statistics during execution of the program. For example, statistics may be gathered that include a count of the number of times each procedure within a program is called during a particular execution. Alternatively, statistics may be gathered that include the execution times of some or all of the procedures called during a particular execution of a program.

This second technique for software instrumentation has proven to be an effective tool for gathering needed data. Unfortunately, the runtime characteristics of the instrumented executable will, by necessity, vary from the runtime characteristics of a standard executable. Additionally, the use of an instrumented executable implies that, if a different type of instrumentation is required or becomes desirable, a different instrumented executable will have to be produced by the system compilation tools. In many cases this involves recompiling, re-assembling and re-linking the program's source modules. For large programs, this may require a substantial amount of time.

It is also generally the case that most system compilation tools offer only a limited range of predefined instrumentation methods. Thus, if a different type of instrumentation is required, it is often necessary to change one or more of the system compilation tools. In many cases, this may be impractical.

The present invention is directed at dynamically linked programming environments. More specifically, in dynamically linked programming environments, such as the Solaris® operating system of Sun Microsystems Inc., each program may include references to "objects" (objects include procedures and functions as well as global data objects) that are not resolved until the program's execution. As part of program execution, each unresolved reference is replaced with the address of the corresponding object. The process of replacing unresolved references is performed by a program known as a runtime linker. Generally, the unresolved references in a program can be replaced as part of the program's invocation. Alternatively, certain unresolved references (namely, those corresponding to procedures and functions) are replaced one by one as they are encountered during program execution. The latter method is generally referred to as "lazy binding," and offers the advantage of resolving only those references that are actually reached during program execution.

SUMMARY OF THE INVENTION

The present invention is a method and apparatus for auditing procedure calls and references to data objects in dynamically linked environments. The present invention includes a runtime linker and an application programming interface (API) that declares a set of auditing procedures. Together, the runtime linker and the API provide a method and apparatus for selectively auditing the dynamically linked procedure calls within a program. More specifically, the API of the present invention includes declarations for procedures that are activated during the dynamic linking of the procedures calls in a program. By defining procedures in accordance with these declarations, the user may cause the runtime linker to select some, or all, of the dynamically linked procedures calls in a program for auditing. Additionally, the procedures defined by the user may cause the runtime linker to use alternate bindings for some or all of the procedures calls in a program. In the case where an alternate binding is used, the runtime linker binds an unresolved reference to a user selected procedure and not to the procedure originally associated with the unresolved binding.

The API also includes declarations for "enter" and "exit" procedures. During program execution, the enter procedure will be called before each procedure call selected for auditing and the exit procedure will be called after each procedure call selected for auditing. By defining procedures in accordance with these declarations, the user may select actions that will occur before the selected procedure calls, and actions that will occur after the selected procedures calls. Thus, by defining procedures in accordance with the API, the user may select which dynamically linked procedure calls will be auditing and may choose actions that will occur before and actions that will occur after the selected procedures calls.

At the invocation of the program selected by the user, the procedures defined by the user in accordance with the API are read by the runtime linker. The user-defined procedures that select dynamically linked procedure calls for auditing are executed. In this way, the runtime linker discovers which dynamically linked procedure calls will be audited. For these audited procedure calls, the runtime linker generates special "glue code." The glue code causes the user-defined entry function to be called before each audited procedure call and causes the user-defined exit procedure to be called after each audited procedure call.

In this way, the present invention provides a method and apparatus that allows instrumentation to be added to a program without recompiling the program or otherwise creating a specialized executable.

Advantages of the invention will be set forth, in part, in the description that follows and, in part, will be understood by those skilled in the art from the description or may be learned by practice of the invention. The advantages of the invention will be realized and attained by means of the elements and combinations particularly pointed out in the appended claims and equivalents.

BRIEF DESCRIPTION OF THE DRAWINGS

The accompanying drawings, that are incorporated in and constitute a part of this specification, illustrate several embodiments of the invention and, together with the description, serve to explain the principles of the invention.

FIG. 4 is a listing showing a program linkage table as initially established in memory as used in accordance with a preferred embodiment of the present.

FIG. 5 is a listing showing the program linkage table of FIG. 4 after execution of a procedure call.

DETAILED DESCRIPTION OF THE PREFERRED EMBODIMENTS

Figure 1:
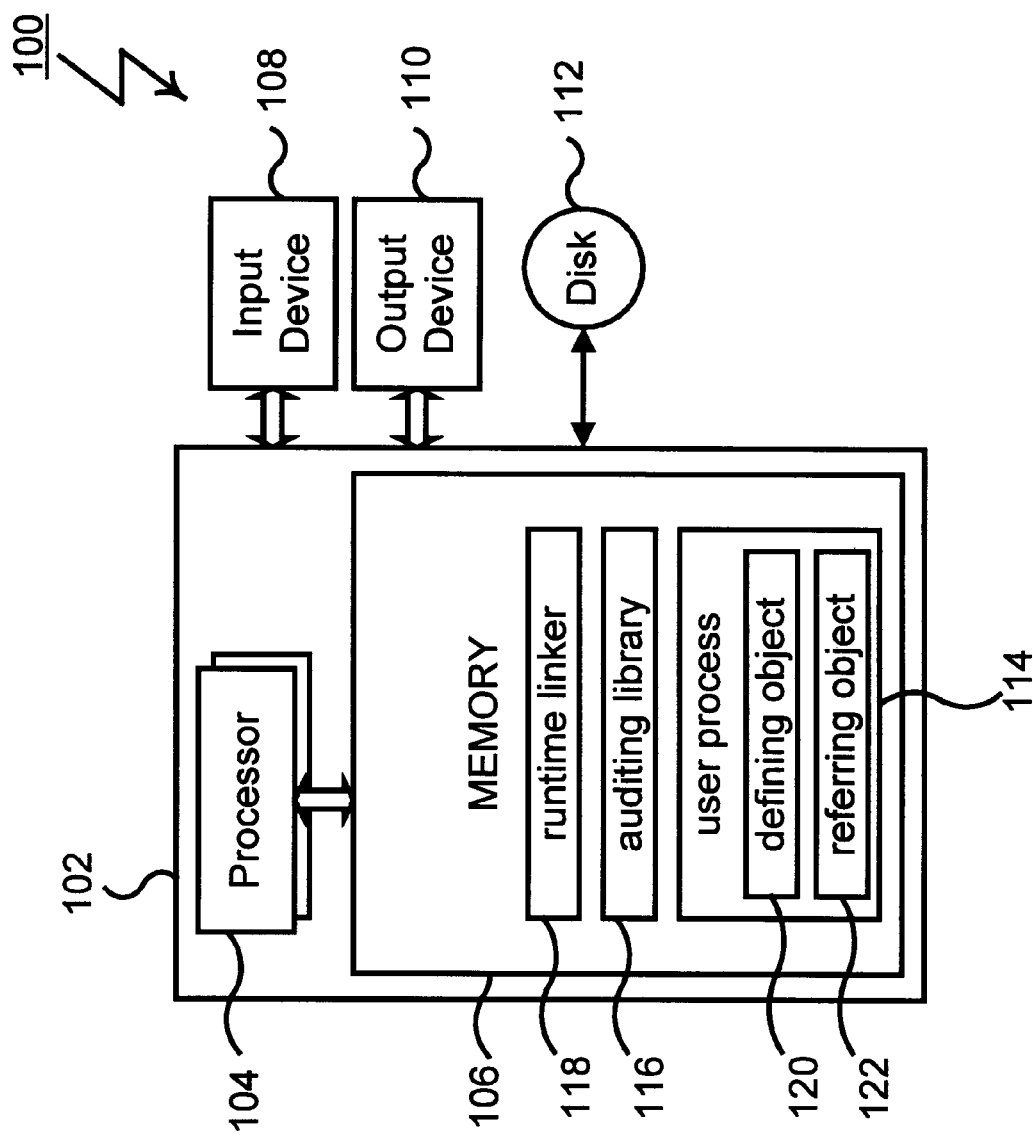
FIG. 1 is a block diagram of a data processing system in accordance with an embodiment of the present invention.

Reference will now be made in detail to preferred embodiments of the invention, examples of which are illustrated in the accompanying drawings. Wherever possible, the same reference numbers will be used throughout the drawings to refer to the same or like parts.
DEFINITIONS For clarity, the following terms are listed with their corresponding definitions.

Object—for the purposes of the present invention, an object is a file containing assembled instructions and data that corresponds to the definitions included in one or more software source files. Objects may be resident in memory or on durable storage, such as a disk drive. Defining objects and referring objects are specific types of objects.

Defining object—an object that defines zero or more procedures and zero or more data items.

Referring object—an object that includes a reference to a procedure or data item defined in a defining object.

Cookie—a generic term for something passed between routines or programs that enables the receiver to perform some operation. In the context of the present invention, cookies are data items used to uniquely identify objects.
UNDERLYING TECHNOLOGY In FIG. 1, a data processing system 100 is shown as a representative environment for the present invention. Structurally, the data processing system 100 includes a host computer 102 that, in turn, includes a processor, or processors 104, and a memory 106. An input device 108 and an output device 110 are connected to the host computer 102 and represent a wide range of varying I/O devices such as disk drives, keyboards, modems, network adapters, printers and displays. A disk drive 112, of any suitable disk drive type, is shown connected to host computer 102. A user process 114, auditing library 116 and runtime linker 118 are shown to be resident in memory 106 of host computer 102.

Figure 2:
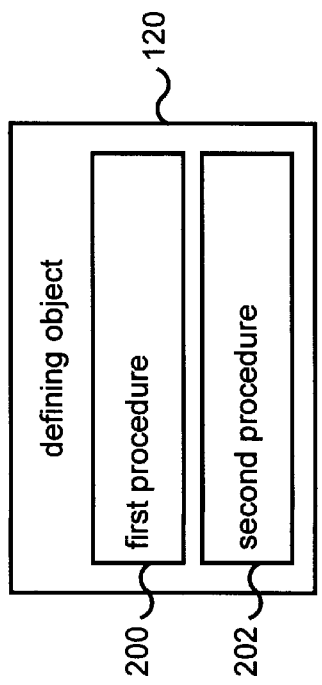
FIG. 2 is a block diagram of a defining object as used in accordance with a preferred embodiment of the present invention.
Figure 3:
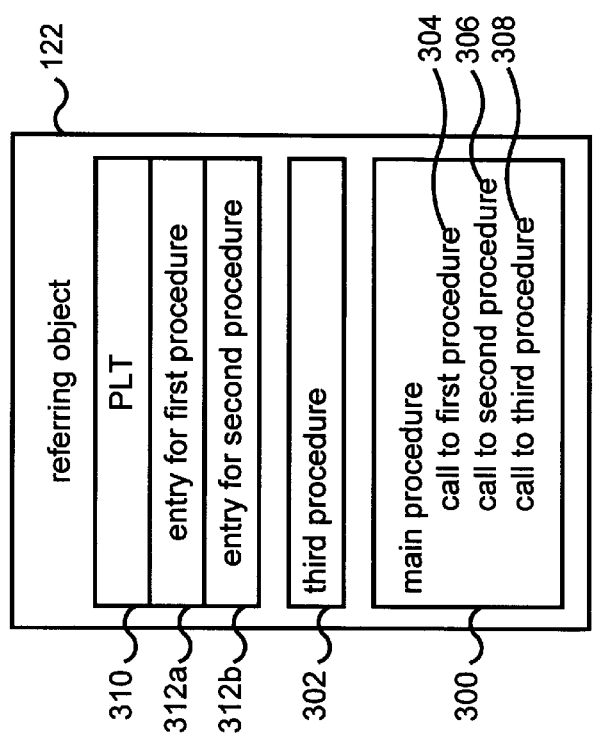
FIG. 3 is a block diagram of a referring object as used in accordance with a preferred embodiment of the present invention.

As shown in FIG. 1, user process 114 includes a defining object 120 and a referring object 122. Defining object 120 is shown in FIG. 2 to include or "define" a "first" procedure 200 and a "second" procedure 202. Referring object 122 is shown in FIG. 3 to include a "main" procedure 300 and a "third" procedure 302. Main procedure 300 includes a call 304 to first procedure 200, a call 306 to a "second" procedure 202, and a call 308 to "third" procedure 302. Referring object 122 is described as "referring" because calls 304 and 306 "refer" to first procedure 200 and second procedure 202 included in defining object 120. Importantly, it should be appreciated that user process 114 is intended to be representative in nature. Thus, user process 114 may include any number of defining objects, such as defining object 120, and any number of referring objects, such as referring object 122.

Continuing with FIG. 3, it may be seen that referring object 122 includes a program linkage table (PLT) 310 having an entry 312a for the first procedure and an entry 312b for the second procedure. For a preferred embodiment of the present invention, references within an object, such as referring object 122, to procedures that are defined in defining objects, such as defining object 120, are performed indirectly through PLT 310.

More specifically, for a preferred embodiment of the present invention, call 304 is implemented as instructions that jump, branch or otherwise transfer control to entry 312a within PLT 310. Similarly, call 306 is implemented as instructions that jump, branch or otherwise transfer control to entry 312b within PLT 310. When referring object 122 is initially established in memory 106, each PLT entry 312 within PLT 310 is implemented as a sequence of instructions. The instructions included in each entry 312 call runtime linker 118. As a result, when call 304 or 306 is executed, control transfers initially to the respective PLT entry 312 which, in turn, calls runtime linker 118.

For example, in FIG. 4, PLT 310 is shown after referring object 122 has been initially established in memory 106. PLT 310 is illustrated using Sparc assembly language instructions. It should be appreciated, however, that the present invention is specifically intended to be equally useful regardless of the particular processor type used. It should also be appreciated that the instructions in PLT 310 are assembled into executable code. The Sparc mnemonics shown in the figures are for ease of explanation.

FIG. 4 shows that both PLT entry 312a and PLT entry 312b initially include instructions transferring control to first PLT entry 400. First PLT entry 400 includes instructions calling runtime linker 118. Within referring object 122, call 304 to first procedure 200 is implemented as instructions that transfer control to PLT entry 312a (more generally, all calls within referring object 122 to first procedure 200 transfer control to PLT entry 312a). Similarly, call 306 to second procedure 202 is implemented as instructions that transfer control to PLT entry 312b (likewise, all calls within referring object 122 to second procedure 202 transfer control to PLT entry 312b). Thus, execution of call 304 to first procedure 200 transfers control to PLT entry 312a. PLT entry 312a, in turn, transfers control to first PLT entry 400. Finally, first PLT entry 400 calls runtime linker 118. In a similar fashion, execution of call 306 to second procedure 202 transfers control to PLT entry 312b. PLT entry 312b, in turn, transfers control to first PLT entry 400 where runtime linker 118 is called.

When activated by a PLT entry 312, runtime linker 118 retrieves symbolic information associated with the activating PLT entry 312. The symbolic information is more commonly known as a "symbol" and is located within the referring object 122. The retrieved symbol describes the procedure being called. For example, in the case of call 304, the runtime linker 118 retrieves a symbol that describes the first procedure 200.

Using the retrieved symbol, the runtime linker 118 locates the called procedure. In general, the called procedure may be included within an object that is resident within memory 106. This is the case for first procedure 200 and second procedure 202 which are included in defining object 120. The called procedure may also be included within a file known as a "shared module" that is resident on a long term storage device, such as disk 112. In the later case, the runtime linker 118 arranges for the shared module to be mapped into memory 106.

Using the location of the called procedure within memory 106, the runtime linker 118 modifies the activating PLT entry 312. More specifically, the runtime linker 118 replaces the sequence of instructions included in the activating PLT entry 312 with instructions that transfer control to the called procedure. Thus, for call 304, the instructions within entry 312a are replaced with instructions that transfer control to the first procedure 200.

For example, in FIG. 5, PLT 310 is shown after the first execution of call 304. As shown in FIG. 5, the instructions included in PLT entry 312a no longer transfer control to first PLT entry 400. Instead, the instructions included in PLT entry 312a jump to the first procedure 200. As discussed previously, this replacement of the instructions in PLT entry 312a was performed by runtime linker 118 the first time call 304 was executed. Subsequently, each time call 304 is executed, control transfers first to PLT entry 312a. PLT entry 312a then transfers control to first procedure 200 without intervention of runtime linker 118. The process of replacing the instructions in a PLT entry, such as PLT entry 312a, with instructions that call a called procedure is known as "binding" and is performed by conventional runtime linkers. The underlying technology discussed in the preceding paragraphs is more clearly described in "Linker and Libraries Guide" published by Sun Microsystems, which is incorporated in this document by reference.

LINKTIME AUDITING

A preferred embodiment of the present invention includes a method and apparatus for linktime auditing. More specifically, a preferred embodiment of the present invention allows a user to specify user-defined procedures that are called by the runtime linker 118 at specific times during the activation of user process 114. User process 114 is not modified to include the linktime auditing procedures. Instead, these procedures are called by the runtime linker 118 during the linking of user process 114. The user creates these user-defined procedures in auditing library 116 in accordance with the prototypes in the following application programming interface (API):

unsigned long
la_objopen (Link_map * lmp, Lmid_t lmid, unsigned int ** cookie);
unsigned int*
la_symbind (Elf32_Sym * sym, unsigned long symndx, unsigned int**
    refcook, unsigned int ** defcook, unsigned long * sb_flags);

If defined by the user and included in the auditing library 116, la_objopen is called by the runtime linker 118 each time an object is initially mapped into memory 106 during the activation of user process 114. Several parameters are passed by the runtime linker 118 to the la_objopen routine. Among these is a pointer to a cookie that identifies the just-mapped object to the other routines included in the auditing library 116 (a pointer to a link map and a link map id are also passed to la_objopen. These entities are discussed more specifically in "Linker and Libraries Guide" published by Sun Microsystems). The user-supplied definition of la_objopen returns a combination of the logical values LA_FLG_BINDTO and LA_FLG_BINDFROM. The runtime linker 118 associates the value returned by la_objopen with the object that has just been mapped into memory. Effectively, each object processed by la_objopen is marked, or labeled, with a logical value that may, or may not, include LA_FLG_BINDTO and may, or may not, include LA_FLG_BINDFROM.

When defined by the user and included in the auditing library 116, la_symbind is called by the runtime linker 118 for all bindings between references, whenever the references are included in objects marked with logical values including LA_FLG_BINDFROM, and definitions, whenever the definitions are included in objects marked with logical values including LA_FLG_BINDTO. For example, as already discussed, runtime linker 118 replaces instructions in PLT entry 312a to bind the first procedure 200 defined in defining object 120 to the referring object 122. To continue this example, la_symbind will be called as part of this binding if referring object 122 is marked with a logical value including LA_FLG_BINDFROM and defining object 120 is marked with a logical value including LA_FLG_BINDTO.

Several parameters are passed by the runtime linker 118 to the user-defined la_symbind routine. Among these is a pointer to the symbol ("sym") associated with the procedure being bound (more specifically a pointer to an ELF symbol and a symbol index are passed to la_objopen. These entities are discussed more specifically in "Linker and Libraries Guide" published by Sun Microsystems). The parameters also include the cookie ("refcook") identifying the referring object, such as referring object 122, and the cookie ("defcook") identifying defining object, such as defining object 120. Finally, a pointer to a flags variable is passed.

Before returning, the user-supplied definition of la_symbind may modify the value of the flags variable. In particular, the user-supplied definition of la_symbind may set the flags variable to a value that may, or may not, include the logical value LA_SYMB_NOPLTENTER and may, or may not, include the logical value LA_SYMB_NOPLTEXIT.

After calling la symbind, the runtime linker 118 completes the binding to the reference in the referring object. To perform this binding, the runtime linker 118 examines the value returned by la_symbind. If the user-supplied definition of la_symbind returns a non-NULL value, that value will be bound by the runtime linker 118 to the reference in the referring object. Typically, the user-supplied definition of la_symbind will return the procedure that is associated with the symbol passed by the runtime linker 118 to la_symbind. This causes the runtime linker 118 to perform the normal binding between the reference in the referring object and the procedure defined in the defining object. Alternately, the user-supplied definition of la_symbind may return a different value if an alternative binding is desired. Typically, an alternative binding may be used whenever a user wishes to override the default bind that would normally be performed by the runtime linker 118. Thus, by correctly defining la_symbind, a user can cause the runtime linker 118 to use a special version of malloc or any other C library function. The runtime linker 118 completes the normal or alternate binding by inserting instructions into the activating PLT entry 312. The inserted instructions call the procedure associated with the value returned by la_symbind.

Figure 6:
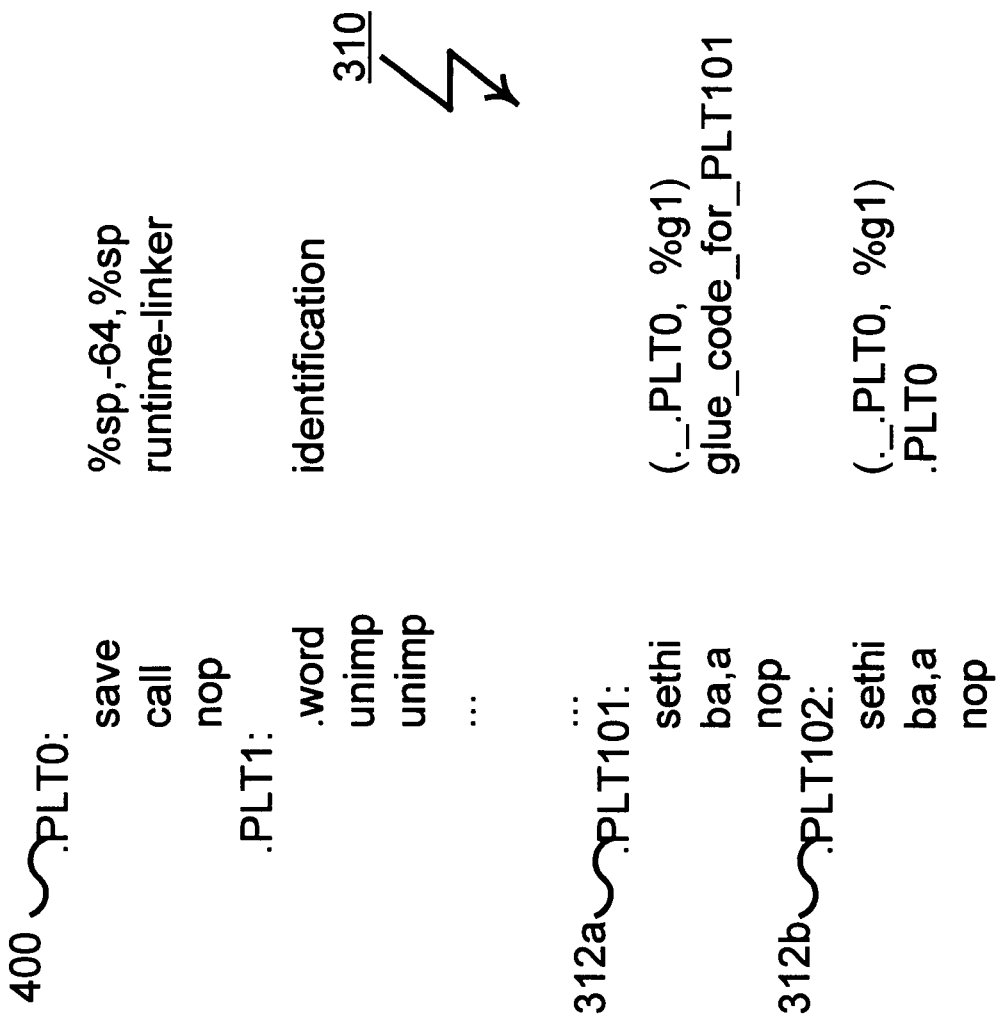
FIG. 6 is a listing showing the program linkage table of FIG. 4 after being modified to activate the glue code of the present invention.

If the user-supplied definition of la_symbind returns a NULL value, the runtime linker 118 selects the activating PLT entry 312 for runtime auditing. To arrange for runtime auditing, the runtime linker 118 modifies the binding process. More specifically, for the modified binding process, the runtime linker creates instructions and data known collectively as "glue code" for the activating PLT entry. The runtime linker 118 then arranges for the glue code to be activated by the activating PLT entry 312. Typically, the runtime linker 118 accomplishes this activation by reconfiguring the activating PLT entry 312 to branch to the created glue code. This may be appreciated more clearly by reference to FIG. 6 where it may be seen that activating PLT entry 312 has been modified to include instructions branching to glue code created for activating PLT entry 312. Alternatively, the runtime linker 118 arranges for the glue code to be activated by inserting the created glue code directly into the PLT entry 312.

The runtime linker 118 initializes the data portion of the glue code generated for the activated PLT entry 312 to include a pointer to the symbol ("sym") and the symbol index associated with the procedure being bound (more specifically, the glue code data is initialized to include a pointer to an ELF symbol and the ELF symbol index). The runtime linker 118 also inserts the cookie ("refcook") identifying the referring object, such as referring object 122, and the cookie ("defcook") identifying defining object, such as defining object 120, into the glue code data. Additionally, the flags variable passed to la_symbind is stored by the runtime linker 118 in the glue code data.

The glue code created by the runtime linker 118 for the activating PLT entry 312 also includes instructions that cause the glue code to call a generic runtime auditing procedure. The glue code's combination of data and instructions calling the generic runtime auditing procedure cause the activating PLT entry 312 to be subject to runtime auditing.

RUNTIME AUDITING

A preferred embodiment of the present invention includes a method and apparatus for runtime auditing. More specifically, a preferred embodiment of the present invention allows a user to specify user-defined procedures that are called each time a procedure is called through a PLT entry 312 previously selected for runtime auditing. The user-defined procedures may, for example, perform timing or auditing procedures during the execution of user process 114. The user creates these user-defined procedures in auditing library 116 in accordance with the prototypes in the following application programming interface (API):

```
unsigned int *
la_pltenter(EIf32_Sym * sym, unsigned long symndx, unsigned int **
    refcook, unsigned int ** defcook, gregset_t regset, unsigned long
    *
    sb_flags);
unsigned int *
la_pltexit (EIf32_Sym * sym, unsigned long symndx, unsigned int **
    refcook, unsigned int ** defcook, unsigned int * retval);
```

Each time the user process 114 calls a procedure through a PLT entry 312 selected for auditing, the glue code created for the PLT entry 312 is executed. Execution of the glue code by the user process 114 causes the user process 114 to call the generic runtime auditing procedure. As part of this procedure call, the data stored by the runtime linker 118 in the glue code is passed to the generic runtime auditing procedure. Specifically, the symbol associated with the procedure being bound, the symbol index associated with the procedure being bound, the cookie identifying the referring object, the cookie identifying defining object and the flags variable are passed as parameters to the generic runtime auditing procedure.

Figure 7:
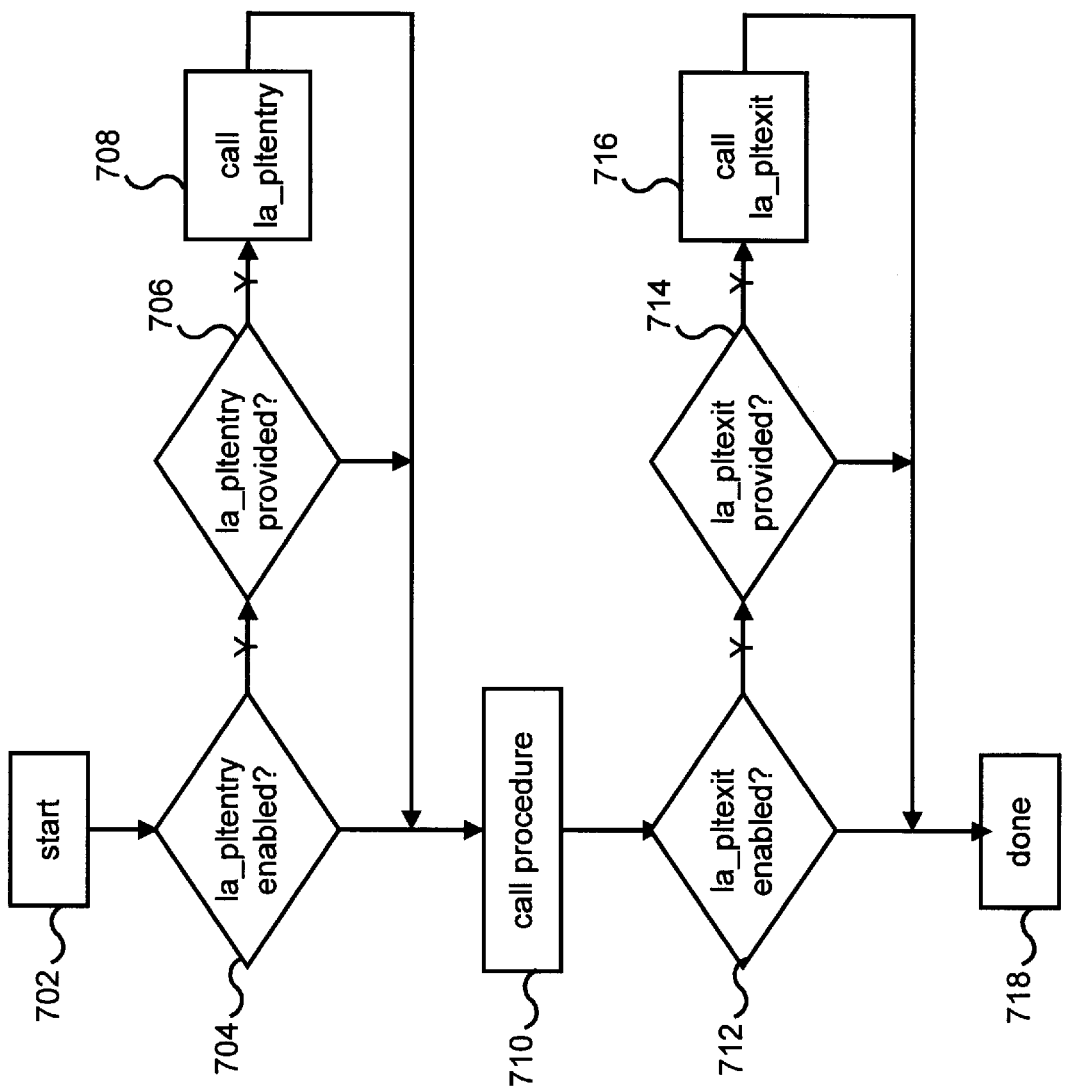
FIG. 7 is a flowchart showing the steps associated with a preferred embodiment of the runtime auditing method of the present invention.

The steps performed by the generic runtime auditing procedure are shown more clearly as method 700 of FIG. 7. It should be appreciated that each of the steps of method 700 are executed by a user process, such as user process 114 as part of a procedure call. As shown in FIG. 7, method 700 begins with step 702. Step 702 is a placeholder that corresponds to activation of the generic runtime auditing procedure. Step 702 is reached, therefore, when a procedure is called using a PLT entry 312 that has been previously selected for runtime auditing.

In step 704, the user process 114 examines the flags variable that has previously been associated with the activating PLT entry 312 (this association is performed by the runtime linker 118 using the flags variable returned by la_symbind. See the preceding description of la_symbind). In particular, the user process 114 determines if the flags variable has been set by la_symbind to include the logical value LA_SYMB_NOPLTENTER. If the flags variable has not been set to include LA_SYMB_NOPLTENTER, method 700 continues at step 706 where the user process 114 determines if a definition for la_pltenter exists in the auditing library 116. As discussed previously, la_pltenter is a user-defined procedure. If the user has created a definition for la_pltenter and included the definition in the auditing library 116, execution of method 700 continues at step 708.

In step 708, the user-supplied definition of la_pltenter is called. Several parameters are passed by the user process 114 to the user-defined la_pltenter routine. Among these is a pointer to the symbol ("sym") associated with the procedure being bound. The parameters also include the cookie ("refcook") identifying the referring object, such as referring object 122, and the cookie ("defcook") identifying defining object, such as defining object 120. Finally, a pointer to a flags variable is passed. The functions performed by la_pltenter are entirely within the discretion of the user. Thus, for example, la_pltenter may be used to start a timer, increment a counter, or to perform limitless other functions.

The value returned by la_pltenter is a procedure that will be called by the user process 114 in step 710. Typically, the user-supplied definition of la_pltenter will return the procedure that is associated with the symbol passed by the user process 114 to la_pltenter. This causes the user process 114 to call the procedure bound to the activating PLT entry 312 (i.e., the procedure that is being called through the activating PLT entry 312). Alternately, the user-supplied definition of la_pltenter may return a different value if the user wishes to substitute a procedure for the procedure being called. In step 710, the procedure returned by la_pltentry is called by the user process 114.

The user-supplied definition of la_pltenter may also set the flags variable to a value that may, or may not, include the logical value LA_SYMB_NOPLTENTER and may, or may not, include the logical value LA_SYMB_NOPLTEXIT. The flags variable is associated by the user process 114 with the activating PLT entry 312. In this way, the user may override the flags variable previously set by la_symbind.

In step 712, the user process 114 examines the flags variable that has previously been associated with the activating PLT entry 312 (this association is performed by the runtime linker 118 using the flags variable returned by la_symbind. See the preceding description of la_symbind). In particular, the user process 114 determines if the flags variable has been set by la_symbind to include the logical value LA_SYMB_NOPLTEXIT. If the flags variable has not been set to include LA_SYMB_NOPLTEXIT, method 700 continues at step 714 where the user process 114 determines if a definition for la_pltexit exists in the auditing library 116. As discussed previously, la_pltexit is a user-defined procedure. If the user has created a definition for la_pltexit and included the definition in the auditing library 116, execution of method 700 continues at step 716.

In step 716, the user-supplied definition of la_pltexit is called. Several parameters are passed by the user process 114 to the user-defined la_pltexit routine. Among these is a pointer to the symbol ("sym") associated with the procedure being bound. The parameters also include the cookie ("refcook") identifying the referring object, such as referring object 122, and the cookie ("defcook") identifying defining object, such as defining object 120. Finally, the return value ("retval") generated by the procedure called in step 710 is passed. The functions performed by la_pltexit are entirely within the discretion of the user. Thus, for example, la_pltexit may be used to stop a timer or for limitless other functions.

The value returned by la_pltexit is the return value that will be returned to the user process 114. Typically, the user-supplied definition of la_pltexit will return the return value generated by the procedure called in step 710. Alternately, the user-supplied definition of la_pltexit may return a different value. In step 718, method 700 terminates.

As shown above, the present invention allows user-defined procedures to be called during the process of linking and during the runtime of user-process 114. These procedures may be used to perform various instrumentation functions such as timing and tracing. Importantly, these procedures are added to the user process 114 without modification to the code used to create user process 114. In this way, the present invention provides a flexible and non-intrusive method for adding instrumentation to processes, such as user process 114.

Other embodiments will be apparent to those skilled in the art from consideration of the specification and practice of the invention disclosed herein. It is intended that the specification and examples be considered as exemplary only, with a true scope of the invention being indicated by the following claims and equivalents.

What is claimed is:

1. A method for binding a reference included in a referring object to a procedure defined in a defining object, the method comprising the steps, performed by a computer system, of:

determining whether the reference has been selected for auditing;

inserting instructions in the referring object, if the reference has been selected for auditing, where the instructions are configured to call, in sequence, a user-defined entry procedure and the procedure defined in the defining object; and inserting instructions in the referring object, if the reference has not been selected for auditing, where the instructions call the procedure defined in the defining object.

2. A method as recited in claim 1 wherein the step of determining whether the reference has been selected for auditing includes the step of calling a user-defined procedure to determine whether auditing will be performed for references included in the referring object.

3. A method as recited in claim 1 wherein the step of determining whether the reference has been selected for auditing includes the step of calling a user-defined procedure to determine whether auditing will be performed for procedures defined in a defining object.

4. A method as recited in claim 1 wherein the step of determining whether the reference has been selected for auditing includes the step of calling a user-defined procedure to determine whether auditing will be performed for that reference.

5. A method as recited in claim 1 further comprising the step of inserting instructions in the referring object, if the reference has been selected for auditing, where the instructions are configured to call a user-defined exit procedure sequentially following a call to the procedure defined in the defining object.

6. A method as recited in claim 1 wherein the referring object includes a program linkage table having an entry that is associated with the procedure defined in the defining object and wherein the instructions inserted into the referring object include instructions inserted into the entry of the program linkage table.

7. A method as recited in claim 1 wherein the steps included in the method are performed by a runtime linker.

8. A computer program product comprising:

a computer usable medium having computer readable code embodied therein for binding a reference included in a referring object to a procedure defined in a defining object, the computer program product comprising:

first computer readable program code devices configured to cause a computer to determine whether the reference has been selected for auditing;

second computer readable program code devices configured to cause a computer to insert instructions in the referring object, if the reference has been selected for auditing, where the instructions are configured to call, in sequence, a user-defined entry procedure and the procedure defined in the defining object; and third computer readable program code devices configured to cause a computer to insert instructions in the referring object, if the reference has not been selected for auditing, where the instructions call the procedure defined in the defining object.

9. A computer program product as recited in claim 8 wherein the first computer readable program code devices include computer readable program code devices configured to cause a computer to call a user-defined procedure to determine whether auditing will be performed for references included in the referring object.

10. A computer program product as recited in claim 8 wherein the first computer readable program code devices include computer readable program code devices configured to cause a computer to call a user-defined procedure to determine whether auditing will be performed for procedures defined in a defining object.

11. A computer program product as recited in claim 8 wherein the first computer readable program code devices include computer readable program code devices configured to cause a computer to call a user-defined procedure to determine whether auditing will be performed for that reference.

12. A computer program product as recited in claim 8 further comprising fourth computer readable program code devices configured to cause a computer to insert instructions in the referring object, if the reference has been selected for auditing, where the instructions are configured to call a user-defined exit procedure sequentially following the call to the procedure defined in the defining object.

13. A computer program product as recited in claim 8 wherein the referring object includes a program linkage table having an entry that is associated with the procedure defined in the defining object and wherein the instructions inserted into the referring object include instructions inserted into the entry of the program linkage table.

14. A method for binding a reference included in a referring object to a procedure defined in a defining object, the method comprising the steps, performed by a computer system, of:

determining whether the reference has been selected for auditing; and inserting in the referring object, if the reference has been selected for auditing, instructions configured to perform runtime auditing.

15. A method as recited in claim 14 wherein the instructions configured to perform runtime auditing are configured to selectively call in sequence, a user-defined entry procedure the procedure defined in the defining object and a user-defined exit procedure.

16. An apparatus for binding a reference included in a referring object to a procedure defined in a defining object, the apparatus comprising:

a first portion configured to determine whether the reference has been selected for auditing;

a second portion configured to insert instructions in the referring object, if the reference has been selected for auditing, where the instructions are configured to call, in sequence, a user-defined entry procedure and the procedure defined in the defining object; and a third portion configured to insert instructions in the referring object, if the reference has not been selected for auditing, where the instructions call the procedure defined in the defining object.

17. An apparatus as recited in claim 16 wherein the first portion is configured to call a user-defined procedure to determine whether auditing will be performed for references included in the referring object.

18. An apparatus as recited in claim 16 wherein the first portion is configured to call a user-defined procedure to determine whether auditing will be performed for procedures defined in a defining object.

19. An apparatus as recited in claim 16 wherein the first portion is configured to call a user-defined procedure to determine whether auditing will be performed for that reference.

20. An apparatus as recited in claim 16 further comprising a fourth portion configured to insert instructions in the referring object, if the reference has been selected for auditing, where the instructions are configured to call a user-defined exit procedure sequentially following the call to the procedure defined in the defining object.

21. An apparatus as recited in claim 16 wherein the referring object includes a program linkage table having an entry that is associated with the procedure defined in the defining object and wherein the instructions inserted into the referring object include instructions inserted into the entry of the program linkage table.

\* \* \* \* \*